(12) United States Patent
Chandak et al.

(10) Patent No.: US 9,815,975 B2
(45) Date of Patent: Nov. 14, 2017

(54) FILM HAVING GOOD BARRIER PROPERTIES TOGETHER WITH GOOD PHYSICAL CHARACTERISTICS

(71) Applicant: Dow Global Technologies LLC, Midland, MI (US)

(72) Inventors: Swapnil Chandak, Pearland, TX (US); Ayush A. Bafna, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 651 days.

(21) Appl. No.: 13/849,891

(22) Filed: Mar. 25, 2013

(65) Prior Publication Data

US 2014/0287215 A1    Sep. 25, 2014

(51) Int. Cl.

| C08J 5/18 | (2006.01) |
| C08L 23/06 | (2006.01) |
| C08L 23/08 | (2006.01) |
| C08K 5/00 | (2006.01) |

(52) U.S. Cl.
CPC .......... *C08L 23/06* (2013.01); *C08J 5/18* (2013.01); *C08K 5/0083* (2013.01); *C08L 23/08* (2013.01); *C08L 23/0815* (2013.01); *C08J 2323/08* (2013.01); *C08J 2423/08* (2013.01)

(58) Field of Classification Search
CPC ...... C08L 2666/06; C08L 23/06; C08L 23/08; C08L 23/0815; C08J 5/18; C08J 2323/08; C08J 2423/08; C08K 5/0083

USPC ......... 428/35.6, 212, 216, 220; 525/242, 90, 525/192; 526/72, 352.2
See application file for complete search history.

(56) References Cited

U.S. PATENT DOCUMENTS

| 3,458,604 | A |   | 7/1969 | Palmer |
| 4,532,280 | A |   | 7/1985 | Kobayashi et al. |
| 5,530,055 | A |   | 6/1996 | Needham |
| 5,530,065 | A | † | 6/1996 | Farley |
| 5,847,053 | A | † | 12/1998 | Chum |
| 5,972,444 | A | † | 10/1999 | Patel |

(Continued)

FOREIGN PATENT DOCUMENTS

| DE | 3415063 A1 | 11/1985 |
| EP | 1699858 A1 | 9/2006 |

(Continued)

*Primary Examiner* — Maria Veronica Ewald
*Assistant Examiner* — Travis Figg
(74) *Attorney, Agent, or Firm* — Dinsmore & Shohl LLP

(57) ABSTRACT

The present invention relates to a monolayer film comprising a mixture of a first linear polyethylene having a density in the range of from 0.926 to 0.970 g/cm$^3$; a second LLDPE having a density in the range of from 0.868 to 0.920 g/cm$^3$; and a nucleating agent to get to a better balance of low WVTR and dart while still allowing film production from it on standard monolayer equipment without need for coextrusion capability. The LLDPE with the higher density is further characterized by having at least 57 percent (by weight of that component) of molecules having a weight average molecular weight in the range of 31,000 g/mole to 1,000,000 g/mole. These components are blended in various ratios ranging from 50 to 90% of the higher density LLDPE, 10 to 50% of the lower density LLDPE and at least 50 ppm of the nucleating agent.

20 Claims, 1 Drawing Sheet

(56) References Cited

U.S. PATENT DOCUMENTS

| | | |
|---|---|---|
| 6,723,793 B2 | 4/2004 | Oswald et al. |
| 6,809,154 B2 | 10/2004 | Lindahl et al. |
| 6,908,968 B2 † | 6/2005 | Jain |
| 7,786,203 B2 | 8/2010 | Hanssen et al. |
| 8,022,133 B2 | 9/2011 | Xu et al. |
| 8,026,305 B2 | 9/2011 | McLeod et al. |
| 8,088,866 B2 | 1/2012 | Backman et al. |
| 8,367,763 B2 | 2/2013 | Backman et al. |
| 2003/0149162 A1 | 8/2003 | Ahlstrand |
| 2005/0038157 A1 | 2/2005 | Kochanowicz et al. |
| 2007/0066733 A1 | 3/2007 | Hanssen et al. |
| 2007/0161739 A1 | 7/2007 | Helland et al. |
| 2008/0118749 A1 | 5/2008 | Aubee et al. |
| 2008/0128937 A1 | 6/2008 | Wang |
| 2008/0227900 A1 † | 9/2008 | Borke |
| 2009/0029182 A1 | 1/2009 | Aubee et al. |
| 2009/0156743 A1 | 6/2009 | Garti et al. |
| 2010/0081767 A1* | 4/2010 | McLeod et al. ............... 525/192 |
| 2010/0084363 A1 | 4/2010 | Michie, Jr. et al. |
| 2010/0105839 A1 | 4/2010 | Mehta |
| 2010/0159173 A1 | 6/2010 | Ashbaugh et al. |
| 2010/0196641 A1 | 8/2010 | De Vos et al. |
| 2011/0028665 A1* | 2/2011 | Eriksson et al. ................ 526/90 |

FOREIGN PATENT DOCUMENTS

| | | | |
|---|---|---|---|
| JP | 200104015 A | | 2/2001 |
| WO | 2013006748 | † | 1/2013 |

\* cited by examiner  
† cited by third party

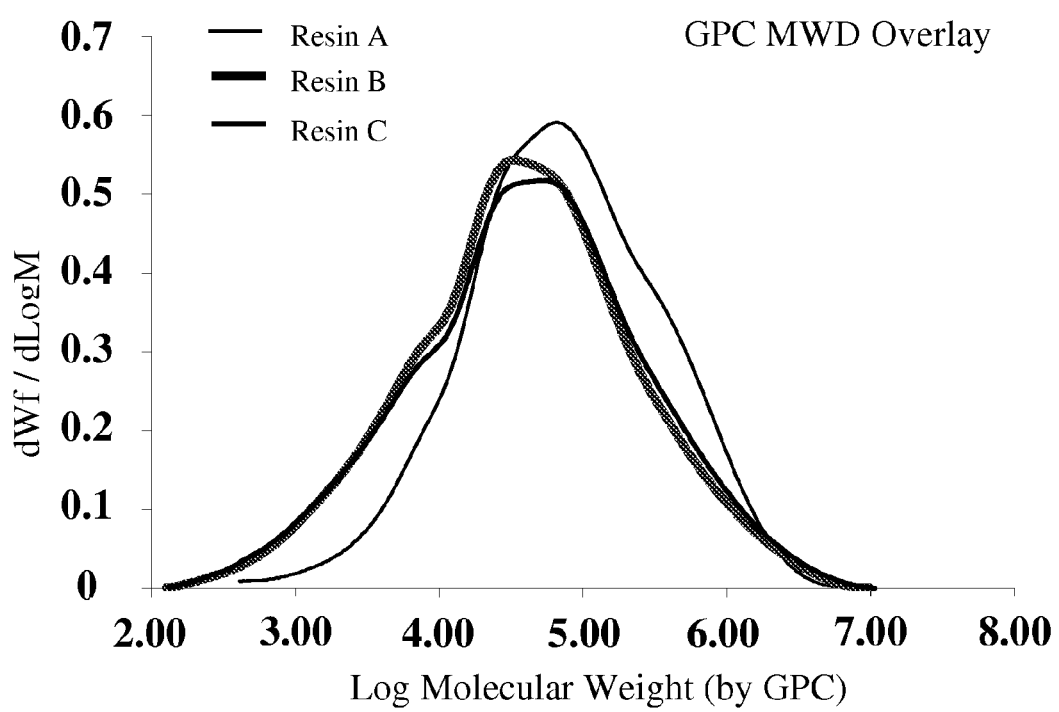

FILM HAVING GOOD BARRIER PROPERTIES TOGETHER WITH GOOD PHYSICAL CHARACTERISTICS

FIELD OF THE INVENTION

The present invention relates to films which are well suited for application requiring a combination of good moisture barrier properties together with good abuse properties. The films comprise two distinct linear low density polyethylenes together with a nucleating agent.

BACKGROUND AND SUMMARY OF THE INVENTION

Over the past ten years there has been a rapid growth in the market for linear low density polyethylene (LLDPE). A broad range of LLDPE's are now used in injection molding, rotational molding, blow molding, pipe, tubing, and wire and cable applications. LLDPE has essentially a linear backbone with only short chain branches, usually about 3 to 10 carbon atoms in length. In LLDPE, the length and frequency of branching, and, consequently, the density, is controlled by the type and amount of comonomer and the catalyst type used in the polymerization.

Many LLDPE resins typically incorporate 1-butene or 1-hexene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPEs manufactured today are used in film products where the excellent physical properties and drawdown characteristics of LLDPE film makes them well suited for a broad spectrum of applications. LLDPE films are often characterized by excellent tensile strength, high ultimate elongation, good impact strength, and excellent puncture resistance.

These properties are generally enhanced by increasing the molecular weight of the resin. However, as the molecular weight of the polyethylene increases, the processability of the resin usually decreases. By providing a blend of polymers, the properties characteristic of high molecular weight resins can be retained and processability, particularly the extrudability can be improved.

Films typically used in the construction industry are generally required to exhibit toughness, processability and good water vapor transmission resistances (WVTR) sometimes referred to as moisture vapor transmission resistance (MVTR).

Today one can improve water vapor barrier properties of films by either using high density polyethylene (HDPE) resins or using engineering polymers like EVOH and Nylon materials. Each of these materials has their own drawbacks. HDPE's have poor abuse (for example, dart impact) properties and so for applications such as films for use in the constructions industry, where dart impact property is needed in addition to low WVTR, HDPE's don't work well. One could use linear low density polyethylene (LLDPE) resins for improved dart properties, but they have poor WVTR properties. Special equipment (multilayer/coex) and costly tie layer resins are needed for adding EVOH or Nylon layers to films and so they have equipment/economic limitations. Accordingly, there is a need for a solution that would allow production of a film with better balance of low WVTR and high dart that can be made on standard (monolayer) equipment without need for high cost tie resins.

The present invention relates to a monolayer film comprising a mixture of a first linear polyethylene having a density in the range of from 0.926 to 0.970 g/cm$^3$; a second LLDPE having a density in the range of from 0.868 to 0.920 g/cm$^3$; and a nucleating agent to get to a better balance of low WVTR and dart while still allowing film production from it on standard monolayer equipment without need for co-extrusion capability. The LLDPE with the higher density is further characterized by having at least 57 percent (by weight of that component) of molecules having a weight average molecular weight in the range of 31,000 g/mole to 1,000,000 g/mole. These components will be blended in various ratios ranging from 50 to 90% of the higher density LLDPE, 10 to 50% of the lower density LLDPE and at least 50 ppm of the nucleating agent. Preferably the film will have a thickness from 1-20 mil, and an overall density in the range of from 0.925 to 0.939 g/cm$^3$.

The inventive films are well suited for construction film (such as a film for use between soil and concrete in building foundation).

BRIEF DESCRIPTION OF THE DRAWINGS

FIG. 1 is an overlay of GPC curves comparing LLDPE which meets the limitation of having 57 percent by weight of molecules having a weight average molecular weight in the range of 31,000 g/mole to 1,000,000 g/mole, to those which do not.

DETAILED DESCRIPTION OF THE INVENTION

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); and High Density Polyethylene (HDPE). These polyethylene materials are generally known in the art; however the following descriptions may be helpful in understanding the differences between some of these different polyethylene resins The term linear polyethylene includes both HDPE and LLDPE. These resins are characterized by limited amounts of long-chain branching as is generally known in the art. "LLDPE", includes both resin made using the traditional Ziegler-Natta catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The Linear PE can be made via gas-phase, solution-phase or slurry polymerization or any combination thereof, using any type of reactor or reactor configuration known in the art, with gas and slurry phase reactors being most preferred.

The term "HDPE" refers to polyethylenes having densities greater than about 0.940 g/cm3, which are generally prepared with Ziegler-Natta catalysts, chrome catalysts or even metallocene catalysts.

"The following analytical methods are used in the present invention:

Density is determined in accordance with ASTM D792.

"Melt index" also referred to as "MI" or "$I_2$" is determined according to ASTM D1238 (190° C., 2.16 kg). "Melt index" is generally associated with polyethylene polymers.

Water Vapor Transmission Rate (or WVTR) is the absolute transmission rate, which can be reported, for example, in units of g/m²day. The ranges of WVTR covered in claims are determined according to ASTM F1249-06 using a Mocon W700 measurement device, at 38° C., with relative humidity of 100% on side and 0% on the other. The sample size used for measurements was 5 cm². For cases where high WVTR led to flooding of the sensor, the sample was masked to a smaller surface area of 1.27 cm² WVTR data may be normalized with respect to sample thickness to a permeability coefficient, for example, in units of g mil/m²day as used herein. Other methods of measurement have also been used herein in some examples to demonstrate trends in WVTR. (See, for example, "Novel Microporous Films and Their Composites," P. C. Wu, Greg Jones, Chris Shelley, Bert Woelfli, Journal of Engineered Fibers and Fabrics; Volume 2, Issue 1-2007.)

The monolayer films of the present invention comprise a mixture of at least three components. The first component (or component A) is a first linear polyethylene having a density in the range of from 0.926 to 0.970 g/cm³. More preferably the linear polyethylene used for component A has a density in the range of 0.935 to 0.958 g/cm³. The resin selected for component A, can be unimodal or multimodal in terms of its molecular weight distribution, with bimodal linear polyethylenes being particularly advantageous for certain applications. The linear polyethylene used for component A may advantageously have a melt index (190° C., 2.16 kg) in the range of 0.05 to 0.50 g/10 min, more preferably from 0.07 to 0.30 g/10 min. The LLDPE for use as component A is further characterized by having at least 57, preferably at least 60, 62, or even at least 65% percent (by weight of that component) of molecules having a weight average molecular weight in the range of 31,000 g/mole to 1,000,000 g/mole.

The second component (or component B) is a second LLDPE having a density in the range of from 0.850 to 0.920 g/cm³. More preferably the linear polyethylene used for component B has a density in the range of 0.865 to 0.910 g/cm³. The linear polyethylene used for component B may advantageously have a melt index (190° C., 2.16 kg) in the range of 0.05 to 1.0 g/10 min, more preferably from 0.25 to 0.75 g/10 min. It is preferred that the combination of component A) and component B) have a melt index in the range of from 0.08 to 0.50 g/10 min.

Component A and Component B are preferably added to form a blend such all of the materials which comprise component A comprise from 50 to 90 percent by weight of the blend and the materials which comprise component B comprise from 10 to 50 percent by weight of the blend.

The third component is and a nucleating agent. Nucleating agents are generally known in the art, and any nucleator known to one skilled in the art for modifying olefin based polymers may be used in the present invention. For example, non-limiting examples of nucleators may include carboxylic acid salts, including sodium benzoate, talc, phosphates, metallic-silicate hydrates, organic derivatives of dibenzylidene sorbitol, sorbitol acetals, organophosphate salts and combinations thereof. In one embodiment, the nucleators are selected from Amfine Na-11 and Na-21, commercially available from Amfine Chemical and Hyperform HPN-68 and Millad 3988, commercially available from Milliken Chemical. In one specific embodiment, the modifier includes Hyperform HPN-20E, commercially available from Milliken Chemical. It is also contemplated that two or more different nucleators may be added as the third component.

The nucleator(s) should be added in an amount of at least 50 ppm, by weight of the combined components A) and B). Preferably the nucleator(s) is added in an amount of from 100 to 3500 ppm, more preferably in an amount of from 500 to 1500 ppm.

As is generally known in the art, the film of the present invention may also include additives, such as antioxidants (e.g., hindered phenolics such as Irganox® 1010 or Irganox® 1076 supplied by Ciba Geigy), phosphites (e.g., Irgafos® 168 also supplied by Ciba Geigy), cling additives (e.g., PIB), Standostab PEPQ™ (supplied by Sandoz), pigments, colorants, fillers, $TiO_2$, anti-stat additives, flame retardants, slip additives, antiblock additives, biocides, antimicrobial agents and the like can also be included in the ethylene polymer extrusion composition of the present invention at levels typically used in the art to achieve their desired purpose.

The components of the films of the present invention may be combined in any way known in the art, including extrusion or dry mixing.

The monolayer film of the present invention may be made using traditional processes. Accordingly, the films may be fabricated via the blown or cast processes. The films of the present invention will have a total thickness in a range of from 1 to 20 microns, preferably 7 to 17 microns. The overall density of the film should be in the range of from 0.925 to 0.939 g/cm³, more preferably in a range of from 0.928 to 0.935 g/cm³.

The monolayer films of the present invention can be characterized by their combination of water (or moisture) vapor transmission rates and toughness. Preferably the films have a water vapor transmission rate of less than 0.50 gm*mil/100 in²*day, more preferably less than 0.45 gm*mil/100 in²*day, still more preferably less than.40 gm*mil/100 in²*day. The monolayer film preferably has a dart impact of at least 140 grams per mil, more preferably at least 160 grams per mil, and still more preferably at least 180 grams per mil.

EXAMPLES

Test Methods

Unless otherwise indicated the following test methods are used in the present invention Film Testing Films are tested for Dart Impact Resistance and Moisture Vapor Transmission rate (MVTR). Dart Impact Resistance is measured using ASTM D1709, ISO-7765-1. Atlas/Dynisco CS-126 Drop Dart Impact Tester was used. 8 inch×8 inch test specimen is held between clamps for testing. A 50.8 mm diameter head is used and dropped from a height of 1.5 meter on to the sample held in the clamp. A stairstep procedure is used until minimum of 20 specimens were tested per test roll in order to get average dart impact resistance. It is verified that the dart head is impacting the center of the clamp and the specimen is not slipping in the clamp. MVTR is measured using ASTM F1249-06(2011) on 15 mil thick films at 38 degree C. and 100 percent(%) Relative Humidity (RH).

Resin Testing

Molecular Weight (MW) and Molecular Weight Distribution (MWD) Determination by HT GPC A PolymerChar (Valencia, Spain) high temperature Gel Permeation Chromatography system consisting of an Infrared concentration/composition detector (IR-5) is used for MW and MWD determination. The carrier solvent is 1,2,4-trichlorobenzene (TCB). The auto-sampler and detector compartments are operated at 160° C., and the column compartment is operated at 150° C. The columns are four PLgel Olexis, 13 micron columns (Agilent). The chromatographic solvent and the sample preparation solvent contain 250 ppm of butylated hydroxytoluene (BHT) and both solvent sources are nitrogen sparged. Polyethylene samples are semi-automatically prepared at targeted concentrations of 2 mg/mL by weighing samples via a computer controlled balance, and delivering calculated amount of solvent via the auto-sampler. Samples are dissolved at 150° C. for 4 hours with gentle agitation, and then hot filtered through Mott® filter by Waters. The filtered solution is re-heated for 30 minutes in the auto-sampler at 160° C. before injection. The injection volume is 200 μl, and the flow rate is 1.0 mL/minute.

Calibration of the GPC column set is performed with 21 narrow molecular weight distribution polystyrene standards. The molecular weights of the standards range from 580 to 8,400,000 g/mol, and are arranged in 6 "cocktail" mixtures, with at least a decade of separation between individual molecular weights.

The polystyrene standard peak molecular weights are converted to polyethylene molecular weights using the following equation (as described in Williams and Ward, J. Polym. Sci., Polym. Let., 6, 621 (1968)):

$$MPE = A(MPS)^B \quad (1)$$

Here B has a value of 1.0, and the experimentally determined value of A is around 0.38.

A fifth order polynomial is used to fit the respective polyethylene-equivalent calibration points obtained from equation (1) to their observed elution volumes for each polystyrene standard. Number average, weight average, and zeta average molecular weights are calculated according to the following equations:

$$Mn = \frac{\sum_i Wf_i}{\sum_i (Wf_i/M_i)} \quad (2)$$

$$Mw = \frac{\sum_i (Wf_i * M_i)}{\sum_i Wf_i} \quad (3)$$

$$Mz = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component.

The weight fraction of resin between certain MW values (M1 to M2) is calculated as following:

$$Wt\% = \frac{\sum_{M_1}^{M_2} Wf_i}{\sum_i Wf_i} \quad (5)$$

The accurate A value is determined by adjusting A value in equation (1) until Mw, the weight average molecular weight calculated using equation (3) and the corresponding retention volume polynomial, agrees with the independently determined value of Mw obtained in accordance with the linear homopolymer reference with known weight average molecular weight of 115,000 g/mol.

Experimental Data

In order to demonstrate the effectiveness of the present invention a series of films are made using 7 layer blown film line. The line is equipped with internal bubble cooling, 200 mm die and 2 mm die gap. The line uses seven 50 mm, 30:1 L/D grooved feed extruders. Gauge profiles are controlled using Alpine Auto-Profile Air Ring system with non contact NDC back scatter gauge measurement device. Films are made at 300 lbs/hr output for 15 mil final thickness at 2.5 Blow Up Ratio (BUR). The extruder profile is set at 200/480/480/480/480/480/480 degree F.

The following materials were used in the Examples:

Resin A is a linear polyethylene as described in Table 1. This resin meets the recitation that at least 57 percent by weight of molecules having a weight average molecular weight in the range of 31,000 g/mole to 1,000,000 g/mole, as seen in Table 1.

Resin B is a linear polyethylene as described in Table 1. This resin does not meet the recitation that at least 57 percent by weight of molecules having a weight average molecular weight in the range of 31,000 g/mole to 1,000,000 g/mole, as seen in Table 1.

Resin C is a linear polyethylene as described in Table 1. This resin does not meet the recitation that at least 57 percent by weight of molecules having a weight average molecular weight in the range of 31,000 to 1,000,000, as seen in Table 1, despite having the same Melt Index as Resin A.

Resin D is a linear polyethylene as described in Table 1

The nucleating agent is Hyperform HPN-20E (disodium salts of hexahydrophthalic acid (HHPA) in combination with acid scavengers (such as organic calcium salts or dihydrotalcite complexes) commercially available from Milliken Chemical.

Description of Various Higher Density LLDPEs Used in the Examples

TABLE 1

| Identification | Melt Index (2.16 Kg @ 190 deg C.) (g/10 min) | MFR (21.6 Kg @ 190 deg C.) (g/10 min) | Density (g/cc) | Weight fraction of the resin between 31,000 and 1,00,000 g/mole weight average molecular weight from conventional GPC |
|---|---|---|---|---|
| Resin A | 0.20 | 9.5 | 0.941 | 0.65 |
| Resin B | 0.32 | 30 | 0.936 | 0.51 |
| Resin C | 0.20 | 20 | 0.937 | 0.53 |
| Resin D | 0.50 | NA | 0.868 | NA |

Film Data

| Film ID | Higher density LLDPE | Lower density LLDPE | Nucleating Agent (ppm) | Dart B g/mil | MVTR gm-mil/[100 in^2-day]) |
| --- | --- | --- | --- | --- | --- |
| Inventive Film 1 | 88 Resin A | 12 Resin D | 100 | >149 | 0.401 |
| Comparative Film 1 | 88 Resin A | 12 Resin D | 0 | NA | 0.511 |
| Comparative Film 2 | 100 Resin A | 0 | 100 | 100 | 0.270 |
| Comparative Film 3 | 95 Resin B | 5 Resin D | 100 | 114 | 0.393 |
| Comparative Film 4 | 88 Resin B | 12 Resin D | 100 | 114 | 0.499 |

As seen from the data above, the presence of the higher density LLDPE, the lower density LLDPE and nucleating agent, all as set forth in the claims, are necessary to have the desired balance of Dart B and barrier properties in this application (Dart B>140 g/mil and MVTR of <0.450 gm–mil/[100 in^2-day]).

What is claimed is:

1. A monolayer film comprising a blend of the following materials:
   a. from 50 to 90% by weight of the film layer of a linear polyethylene resin having a density in the range of from 0.926 to 0.970 g/cm$^3$ wherein such linear polyethylene comprises at least 57 percent by weight of molecules having a weight average molecular weight in the range of 31,000 g/mole to 1,000,000 g/mole;
   b. from 10 to 50% by weight of the film layer of a linear polyethylene having a density in the range of from 0.868 to 0.920 g/cm$^3$;
   c. at least 50 ppm based on components a) and b), of a nucleating agent
      1. wherein the film has an overall density in the range of from 0.925 to 0.939 g/cm$^3$.

2. The monolayer film layer of claim 1 where the layer has a thickness of from 1 to 20 mil.

3. The monolayer film layer of claim 1 where the layer has a thickness of from 4 to 15 mil.

4. The monolayer film of claim 1 wherein the nucleator is present in an amount of from 100 to 3500 ppm.

5. The monolayer film of claim 1 wherein the nucleator is present in an amount of from 500 to 1500 ppm.

6. The monolayer film layer of claim 1 where the layer is characterized by having a water vapor transmission rate of less than 0.50 gm*mil/100 in$^2$*day.

7. The monolayer film layer of claim 1 where the layer is characterized by having a moisture vapor transmission rate of less than 0.45 gm*mil/100 in$^2$*day.

8. The monolayer film layer of claim 1 where the layer is characterized by having a moisture vapor transmission rate of less than 0.40 gm*mil/100 in$^2$*day.

9. The monolayer film layer of claim 1 where the layer is characterized by having a dart impact of at least 140 grams per mil.

10. The monolayer film layer of claim 1 where the layer is characterized by having a dart impact of at least 160 grams per mil.

11. The monolayer film layer of claim 1 where the layer is characterized by having a dart impact of at least 180 grams per mil.

12. The monolayer film layer of claim 1 where the film has an overall density in the range of from 0.928 to 0.935 g/cm$^3$.

13. The monolayer film layer of claim 1 wherein component a) has a density in the range of 0.935 to 0.958 g/cm$^3$.

14. The monolayer film layer of claim 1 wherein component (a) has a melt index of from 0.05 to 0.50.

15. The monolayer film layer of claim 1 wherein component (b) has a melt index of from 0.05 to 1.0.

16. The monolayer film layer of claim 1 wherein overall blend has a melt index of from 0.08 to 0.50.

17. The monolayer film layer of claim 1 where the nucleating agent is selected from the group consisting of carboxylic acid salts, including sodium benzoate, talc, phosphates, metallic-silicate hydrates, organic derivatives of dibenzylidene sorbitol, sorbitol acetals, organophosphate salts and combinations thereof.

18. The monofilm layer of claim 1 wherein component a) comprises at least 60 percent by weight of molecules having a weight average molecular weight in the range of 31,000 g/mole to 1,000,000 g/mole.

19. The monofilm layer of claim 1 wherein component a) comprises at least 62 percent by weight of molecules having a weight average molecular weight in the range of 31,000 g/mole to 1,000,000 g/mole.

20. The monofilm layer of claim 1 wherein component a) comprises at least 65 percent by weight of molecules having a weight average molecular weight in the range of 31,000 g/mole to 1,000,000 g/mole.

* * * * *